United States Patent [19]

Boothe et al.

[11] E Re. 28,543

[45] Reissued Sept. 2, 1975

[54] ELECTROCONDUCTIVE PAPER

[75] Inventors: Jerry E. Boothe, Pittsburgh, Pa.; Merwin Frederick Hoover, Topsfield, Mass.

[73] Assignee: Calgon Corporation, Pittsburgh, Pa.

[22] Filed: Nov. 1, 1974

[21] Appl. No.: 520,077

Related U.S. Patent Documents

Reissue of:

[64] Patent No.: 3,544,318
Issued: Dec. 1, 1970
Appl. No.: 743,634
Filed: July 10, 1968

[52] U.S. Cl. ..... 428/514; 96/1.5; 162/138; 260/29.7; 260/80.3; 260/88.3; 427/121; 427/391

[51] Int. Cl.[2] ..... B44D 1/00; G03G 7/00

[58] Field of Search...96/1.5; 117/155 UA, 201, 161; 427/121, 391; 428/514; 162/138; 260/29.7, 80.3, 88.3

[56] References Cited

UNITED STATES PATENTS

| | | | |
|---|---|---|---|
| 2,926,161 | 2/1960 | Butler et al. | 260/89.7 |
| 3,216,853 | 11/1965 | Gess | 117/201 |

*Primary Examiner*—Michael R. Lusignan
*Attorney, Agent, or Firm*—Rudolph J. Anderson, Jr.; Harry E. Westlake; Martin L. Katz

[57] ABSTRACT

Electroconductive paper useful typically in making copies by an electrosatic process is made by incorporating therein a polymer comprising at least 90% monomers of the formula

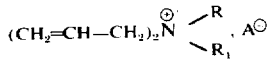

where R is an alkyl group of one to 18 carbon atoms and $R_1$ is R or $\beta$-propionamido and A is an anion.

17 Claims, No Drawings

ELECTROCONDUCTIVE PAPER

Matter enclosed in heavy brackets [ ] appears in the original patent but forms no part of this reissue specification; matter printed in italics indicates the additions made by reissue.

RELATED APPLICATION

This is a continuation-in-part of our copending application, Ser. No. 462,742 filed June 9, 1965, now abandoned.

BACKGROUND OF THE INVENTION

This invention relates to paper containing electroconductive materials. In particular, it relates to paper rendered electroconductive by a layer or coating of electroconductive material, which paper is useful in various copying processes and devices.

Electroconductive paper may be used to distribute electrical stresses in various insulating products; see U.S. Pat. No. 3,148,107. Where electrically conductive paper is to be used for nonimpact printing, a substrate, backing, impregnation coating, or layer of electrically conductive material is usually constructed. See Vaurio and Ford, "Electrically Conductive Paper for Nonimpact Printing," Tappi, December 1964, vol. 47, No. 12, pp. 163A–165A. Various types of nonimpact printing processes are known as electrostatographic, electrophotographic, electrographic, "Electrofax," and other processes. As a rule such processes call for the placement of an electric charge on the paper, which may be accomplished by a corona discharge, for example. The charge is, in most such processes, placed on the paper in darkness. The paper may also contain a photoresponsive or photo-conductive layer or material, now popularly a specially treated zinc oxide, which causes the charge to be dissipated in an area where light strikes it, thus leaving a pattern of the charged areas which is a reproduction of the image desired. The charged area attracts a powdered or other usually particulated image-forming material which may be fused or otherwise treated to make the image permanent. Other processes differ in that the image is created by electrical dissipation of the static charge in nonimage areas; in this and other processes (see Vaurio and Ford, supra), the common characteristic is an electrically conductive base paper.

Probably the most common system at present is the direct electrostatic process; see "Chemical & Engineering News," July 20, 1964, pp. 88–89; U.S. Pat. No. 3,052,539. This process is similar to the xerographic method of copy reproduction; however, the conductive substrate is built into paper rather than being on a separate drum or other device.

Among the desirable characteristics of an electrically conductive material for use in nonimpact printing are whiteness and stability of conductivity over a wide range of relative humidity. Various inorganic additives have been rejected or criticized by workers in the art because of their excessive weight and/or objectionable color as well as their poor tolerance of humidity variations. The organic polymers suggested by Silvernail and Zembal, U.S. Pat. No. 3,011,918, have objectionable odors and tastes result in objectionable background colorations on the paper.

SUMMARY OF THE INVENTION

Our invention is useful in imparting electroconductive characteristics to the paper for use in such processes as the above.

We have discovered that the class of water-soluble polymers containing at least about 90% repeating groups of the formula

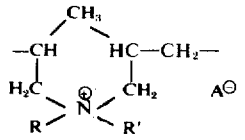

where R is an alkyl group containing one to eighteen carbon atoms, R′ is selected from the group consisting of R and

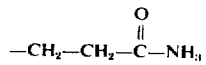

and A is an anion, may be used in making electroconductive paper. Any water-soluble polymer of this description is within the scope of our invention.

The preferred homopolymer of the described class is derived from free radical polymerization of dimethyl diallyl ammonium chloride. The polymerization method described by Butler and Angelo, "Journal of American Chemical Society," vol. 79, p. 3128 (1957), may be used satisfactorily to make polymers which perform in our invention. Also useful in the homopolymer of the monomer diallyl methyl β-propionamido ammonium chloride. Other polymers useful in our invention are included in the description of Butler's U.S. Pat. No. 3,288,770.

Diallyl ammonium monomers undergo cyclization during free radical polymerization to form piperidinium rings. The homopolymer of dimethyl diallyl ammonium chloride may be described as a polydimethyl-3,5-methylene piperidinium salt. The homopolymer of diallyl methyl β-propionamido ammonium chloride, for example, is known as poly [N-methyl-N(β-propionamido) 3,5-methylene piperidinium chloride].

Thus, polymers containing repeating groups of Formula I may be derived from polymerization of monomers of the formula

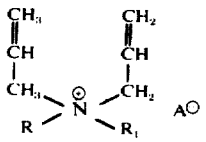

where R is an alkyl group of one to 18 carbon atoms, $R_1$ is selected from the group consisting of R and β-propionamido, and $A^-$ is an anion.

Anions which are particularly of interest are fluoride, chloride, bromide, hydroxide, nitrate, acetate, $HSO_4^-$ and $H_2PO_4^-$.

Water-soluble copolymers and more complex polymers of the above-described monomers containing at least about 90% of Formula I repeating groups are contemplated within the scope of our invention. Any copolymerizable monomer which will form a water-soluble polymer with the diallyl monomer may be used for the remaining 10%. Among the monoethylenically unsaturated copolymerizable monomers suitable for use in our invention are acrylamide, diacetone acrylamide, N-vinyl pyrrolidinone, and N-methylolacrylamide. We prefer to use as the comonomer with the diallyl quaternary ammonium compounds, a compound which is copolymerizable therewith and which is represented by the general formula

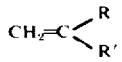

or, after polymerization, as

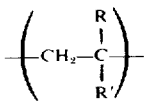

where R represents a member of the class consisting of hydrogen, halogen, R′ and alkyl groups of one to four carbon atoms, and R′ represents a radical of the class consisting of aryl and alkaryl radicals and radicals represented by the formulas

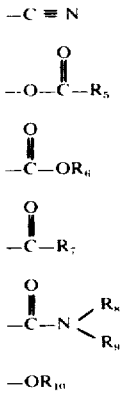

where $R_5$ and $R_6$ each represents a radical selected from the class consisting of alkyl, cycloalkyl, and alkoxyalkyl radicals, $R_7$ has the same meaning as $R_5$ and $R_6$ and, in addition, an aryl radical, $R_8$ and $R_9$ each represents a member of the class consisting of hydrogen, and alkyl, cycloalkyl, aryl, alkaryl, aralkyl, and alkoxyalkyl radicals, and $R_{10}$ has the same meaning as $R_5$ and $R_6$. See Schuller and Thomas U.S. Pat. No. 2,923,701 for a description of the mechanism of copolymerization of such monomers with the diallyl quaternary ammonium compounds discussed above. See also Schuller et al., "Journal of Chemical & Engineering Data," vol. 4, p. 273 (1959).

We may also use diallyl amine monomers which are preferably copolymerized in the form of a hydrohalide salt. See Butler, Angelo, and Cranshaw, U.S. Pat. No. 2,926,161. They may be described in terms of the formula

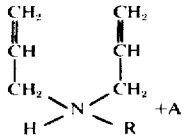

where R is an alkyl group of one to four carbon atoms or β-propionamido, and $A^-$ is a halide anion.

Also contemplated in our invention is the use in paper of the above-described homopolymers and copolymers having included in their polymerized structures certain compatible polyethylenic unsaturated compounds. Such polyethylenic unsaturated compounds, when present in small amounts (i.e., up to about 10%) during the polymerization of a dialkyl diallyl ammonium halide monomer, cause the resulting polymer to be highly branched and/or cross-linked. The branched polymer also imparts superior barrier properties to the paper substrate preventing solvent from the application of the photoconductive upper layer from diffusing into the paper. The preferred branching agents are methylene bisacrylamide, triallyl amine hydrohalide salts, triallyl quaternary ammonium salts having as a fourth group an alkyl group of one to four carbon atoms, and tetraallyl ammonium salts. However, we may use any water soluble, polyunsaturated compound which is copolymerizable with the diallyl monomers previously described. Polyallyl sucrose and other allyl substituted polyalcohols may be used, as well as polyallyl polyamine hydrohalides and quaternary salts. The amount of each of these branching agents required to get the desired results varies with each compound, the only requirement being that irreversible (water-insoluble) gel formation should be avoided. As little as 0.001% of such branching agent will significantly improve the film forming ability of the polymer. Preferred ranges are between about 0.01 percent and 0.1 percent.

As is known in the art of electrostatic printing and other forms of nonimpact printing, conductivity measurements for conductive coatings on paper may be made on the conductive areas only; that is, the electrodes of the conductivity device may be simply attached to the conductive surface of the paper. Generally speaking, papers adapted for use in various types of nonimpact printing may have surface resistivities in the range of about $2.5 \times 10^5$ to about $3.0 \times 10^9$. Molecular weights of our polymers are apparently not critical to conductivity.

The following examples illustrate not only the utility of our invention in electroconductive paper, but also the conductivity of the paper at various relative humidities. The indicated changes in conductivity with relative humidity are comparatively excellent in the present state of the art.

EXAMPLE I

A 4% by weight aqueous solution of a copolymer of dimethyl diallyl ammonium chloride and methyl dodecyl diallyl ammonium chloride in the molar ratio of 17.5 to 1 was applied to Bergstrom Paper Company's Indsen No. 1 raw coating stock (basis weight 46 lbs. per 3,300 square feet) using a 3 mil, wire-wound Meyer rod. This rod applies approximately 0.3 lb. of pure polymer per 3,000 square feet of paper. The sample was then dried in an oven at 105° C. for 20 to 30 minutes. An 8 square inch circular sample was cut and placed into a constant conditions room for 16 hours at 50% relative humidity and 72° F. After this period, the sample was conditioned for 72 hours at 23% relative humidity. Current measurements were made after applying 100 v. DC using Keithley equipment consisting of a Model No. 240 Regulated High Voltage Supply, a Model No. 6105 Resistivity Adapter and a Model 610—B Electrometer. The resistivity adapter is suitable for determining both surface and volume resistivities. Electrodes are constructed of stainless steel; however, for measurements at relative humidities of greater than 70% a special graphite center electrode was used. Current readings were converted to obtain resistivity values. The surface resistivity of this polymer was $5.9 \times 10^{3}$ ohms/square.

EXAMPLE II

Poly(N,N - dimethyl-3,5-methylene piperidinium chloride) was prepared in aqueous solution and applied to a paper by a Time-Life bench coater. Two pounds of polymer covered an area of 3,000 sq. ft. After drying, conductivity measurements showed the following surface resistances at the relative humidities indicated in terms of ohms/square:

| Rel. Humidity | 20 | 45 | 80 |
|---|---|---|---|
| | $3\times10^{9}$ | $6\times10^{7}$ | $7\times10^{5}$ |

Using the same polymer in a concentration of three pounds per 3,000 sq. ft., the following surface resistances were found:

| Rel. Humidity | 20 | 45 | 80 |
|---|---|---|---|
| | $6.0\times10^{8}$ | $5.0\times10^{7}$ | $6.0\times10^{5}$ |

EXAMPLE III

In another test in which two pounds of our preferred homopolymer was spread on 3,000 sq. ft. of paper, the conductivity results, measured in terms of surface resistance, were virtually identical to a polymer disclosed in U.S. Pat. No. 3,011,918. There were no objectionable odor or background discoloration in the paper treated with the polymers of our invention.

EXAMPLE IV

A 4% by weight aqueous solution of poly (methyl β-propionamido diallyl ammonium chloride) was applied to the test paper as above. After treatment as in Example I, this paper gave a surface resistivity value of $2.0 \times 10^{10}$.

EXAMPLE V

A 4% by weight solution of a copolymer of dimethyl diallyl ammonium chloride (93% by weight) acrylamide (4%) and acryonitrile (3%) was applied and treated as in Example I. At a relative humidity of 12%, the surface resistivity was $8.6 \times 10^{10}$.

EXAMPLE VI

A 4% by weight solution of a copolymer of dimethyl diallyl ammonium chloride (96% by weight) and acrylonitrile (4%) was applied and treated as in Example I. At a relative humidity of 16%, the surface resistivity was $1.8 \times 10^{10}$.

EXAMPLE VII

A 4% by weight solution of a copolymer of dimethyl diallyl ammonium chloride (95% by weight) and diacetone acrylamide 5% was applied and treated as in Example I. The surface resistivity at 24 % relative humidity was $3.6 \times 10^{9}$.

EXAMPLE VIII

A 4% solution of homopolymer of diethyl allyl ammonium chloride was applied and treated as in Example I. The surface resistivity at 20% relative humidity was $7.9 \times 10^{11}$.

EXAMPLE IX

A 4% by weight solution of a copolymer of dimethyl diallyl ammonium chloride copolymerized with 0.03 weight percent methylene bisacrylamide was applied and treated as in Example I. The surface resistivity at 23% relatively humidity was $1.8 \times 10^{10}$.

EXAMPLE X

A 4% solution of dimethyl diallyl ammonium copolymerized with 0.12 weight percent tetraallyl ammonium chloride was applied and treated as in Example I. The surface resistivity at 23% relative humidity was $1.4 \times 10^{10}$.

Solutions of our polymers may be applied to paper or cellulosic webs by coating, diping, brushing, wet end addition, etc. Concentrations of the polymer may vary widely to fit the method of handling. Generally about 0.5–3.0 pounds of polymer should be applied per 3,000 sq. ft. but for some purposes as little as 0.1 pound will provide sufficient conductivity. The upper limit of addition will be determined largely by economics; so far as we are aware, there is no upper limit which is or will be detrimental to the electroconductive character of the paper.

We do not intend to be limited to the specific examples and illustrations employed in the preceding description of our invention. It may be otherwise variously practiced within the scope of the following claims.

We claim:

1. Electroconductive paper including a layer of poly-[N-methyl-N-(β-propionamido)-3,5-methylene piperidinium chloride].

2. Electroconductive paper including a layer of poly-(N,N-dimethyl-3,5-methylene piperidinium chloride).

3. Electroconductive paper including a layer of poly-(N,N-dimethyl-3,5-methylene piperidinium chloride) crosslinked with from about 0.1% to about 1% methylenebisacrylamide, based on the weight of the polymer.

4. Electroconductive paper containing about 0.1 to about 3.0 pounds per 3000 square feet of at least one water-soluble polymer comprising at least 90% by weight groups of the formula

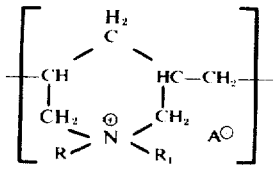

where R is an alkyl group containing one to eighteen *four* carbon atoms, $R_1$ is selected from the group consisting of R and

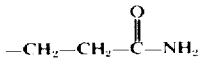

and A is an anion.

[ 5. Paper of claim 4 in which the water-soluble polymer contains up to 10% by weight diallyl amine of the formula $(CH_2{=}CH{-}CH_2)_2NY$ where Y is an alkyl group of up to 18 carbon atoms.]

[ 6. Paper of claim 4 in which the water-soluble polymer contains up to 10% by weight groups of the formula

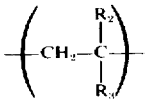

where $R_2$ represents a member of the class consisting of hydrogen, halogen, and alkyl groups of one to four carbon atoms, and $R_3$ represents a radical of the class consisting of aryl and alkaryl radicals and radicals represented by the formulas

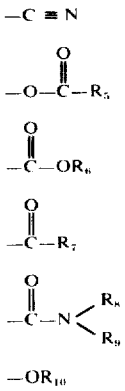

where $R_5$ and $R_6$ each represents a radical selected from the class consisting of alkyl, cycloalkyl, and alkoxyalkyl radicals, $R_7$ has the same meaning as $R_5$ and $R_6$ and, in addition, an aryl radical, $R_8$ and $R_9$ each represents a member of the class consisting of hydrogen, and alkyl, cycloalkyl, aryl, alkaryl, aralkyl, and alkoxyalkyl radicals and $R_{10}$ has the same meaning as $R_5$ and $R_6$.]

7. Paper of claim 4 in which the polymer includes up to about 10% by weight units derived from the group consisting of acrylamide, diacetone acrylamide, N-methylolacrylamide, and N-vinyl 2-pyrrolidinone.

8. Paper of claim 4 in which the polymer includes up to about 10 weight percent of a water soluble polyethylenically unsaturated monomer branching agent.

9. Paper of claim 8 in which the water soluble polyethylenically unsaturated monomer is selected from the group consisting of methylene bisacrylamide, triallyl amine hydrohalide salts, tetrallyl ammonium salts, and triallyl ammonium salts including an alkyl group of 1 to 4 carbon atoms.

10. Electroconductive paper containing at least about 0.1 pound per 3000 square feet of at least one water-soluble polymer consisting essentially of units derived from monomers of the formula

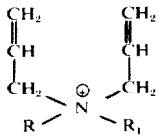

where R is an alkyl group of one to [18] *four* carbon atoms and $R_1$ is selected from the group consisting of R and

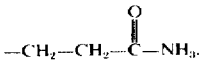

11. Paper of claim 10 in which the polymer consists essentially of units derived from dimethyl diallyl ammonium chloride.

12. Electroconductive paper containing at least about 0.1 pound per 3,000 square feet of at least one water-soluble polymer derived from polymerization of a monomer mix of (a) monomers of the formula

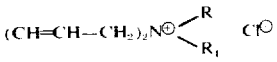

where R is an alkyl group of one to 18 carbon atoms, $R_1$ is selected from the group consisting of R and β-propionamido, and (b) up to about 10% by weight of a water-soluble copolymerizable branching agent*selected from the group consisting of polyallyl substituted polyalcohols, polyallyl substituted polyamine hydrohalides and quaternary salts, and N,N'-methylene bisacrylamide.*

[ 13. Paper of claim 12 in which the branching agent is selected from the group consisting of polyallyl substituted polyalcohols, polyallyl substituted polyamine hydrohalides and quaternary salts, and N,N'-methylene bisacrylamide. ]

14. Method of making electroconductive paper comprising incorporating therein at least about 0.1 pound per 3,000 square feet of a water-soluble polymer consisting essentially of repeating units derived from dimethyl diallyl ammonium chloride.

15. Method of making electroconductive paper comprising incorporating in said paper about 0.1 to about 3.0 pounds, per 3,000 square feet of paper, of water-soluble polymer comprising at least 90% by weight groups of the formula

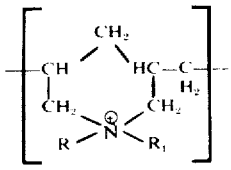

where R is an alkyl group of one to [18] *four* carbon atoms and $R_1$ is selected from the group consisting of R and

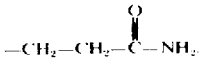

16. Method of claim 15 in which the polymer contains a cross-linking agent.

17. Method of claim 15 in which the polymer contains a branching agent.

18. Method of claim 15 in which the polymer is a homopolymer of dimethyl diallyl ammonium chloride and is incorporated to the extent of at least 0.5 pound per 3,000 square feet of paper.

19. Method of claim 15 in which the polymer is added to the paper in the form of an aqueous solution.

20. Method of claim 15 in which a solution of polymer is formed into a layer on the paper and subsequently dried.

* * * * *

UNITED STATES PATENT OFFICE

CERTIFICATE OF CORRECTION

PATENT NO. : Re. 28,543

DATED : September 2, 1975

INVENTOR(S) : Jerry E. Boothe and Merwin Frederick Hoover

It is certified that error appears in the above-identified patent and that said Letters Patent are hereby corrected as shown below:

Column 7, lines 1 and 2, "eighteen" should read -- [eighteen] --.

Signed and Sealed this

*sixth* Day of *January 1976*

[SEAL]

*Attest:*

RUTH C. MASON
*Attesting Officer*

C. MARSHALL DANN
*Commissioner of Patents and Trademarks*